is

(12) United States Patent
Yang (10) Patent No.: US 9,609,977 B2
(45) Date of Patent: Apr. 4, 2017

(54) MAGNETIC/FLOATING FORCE BASED BREWING STRUCTURE

(71) Applicant: Shiu-Cheng Yang, Taoyuan County (TW)

(72) Inventor: Shiu-Cheng Yang, Taoyuan County (TW)

( * ) Notice: Subject to any disclaimer, the term of this patent is extended or adjusted under 35 U.S.C. 154(b) by 9 days.

(21) Appl. No.: 14/740,287

(22) Filed: Jun. 16, 2015

(65) Prior Publication Data

US 2016/0157662 A1    Jun. 9, 2016

(30) Foreign Application Priority Data

Dec. 8, 2014  (TW) .............................. 103142539 A (51) Int. Cl.
  *A47J 31/20*  (2006.01)
  *A47J 31/06*  (2006.01)
  *A47J 31/18*  (2006.01)

(52) U.S. Cl.
  CPC .......... *A47J 31/18* (2013.01); *A47J 31/0626* (2013.01); *A47J 31/0636* (2013.01); *A47J 31/20* (2013.01)

(58) Field of Classification Search
  CPC .... A47J 31/06; A47J 31/0626; A47J 31/0636; A47J 31/18; A47J 31/20
  USPC .............. 99/289 R, 296, 297, 317–320, 322
  See application file for complete search history.

(56) References Cited

U.S. PATENT DOCUMENTS

| | | | | |
|---|---|---|---|---|
| 3,665,841 A * | 5/1972 | Hardy | ...................... | A47J 31/20 99/281 |
| 3,724,359 A * | 4/1973 | Masters | .................. | A47J 31/20 99/281 |
| 4,327,632 A * | 5/1982 | Batty | ...................... | A47J 31/20 99/320 |
| 2010/0018403 A1 * | 1/2010 | Hoare | ...................... | A47J 31/20 99/281 |
| 2011/0072979 A1 * | 3/2011 | Fogg, IV | .............. | A47J 31/005 99/288 |
| 2012/0318148 A1 * | 12/2012 | MacDonald | ............ | A47J 31/20 99/282 |
| 2013/0055901 A1 * | 3/2013 | Zhang | ...................... | A47J 31/20 99/279 |
| 2014/0150667 A1 * | 6/2014 | Liao | ........................ | A47J 31/20 99/323 |

* cited by examiner

*Primary Examiner* — Dana Ross
*Assistant Examiner* — Lindsey C Staubach
(74) *Attorney, Agent, or Firm* — Leong C. Lei (57) ABSTRACT

A magnetic/floating force based brewing structure is used with an outer container. The magnetic/floating force based brewing structure includes an internal receptacle, which includes a receiving section, a floating structure, and an acted magnet, and an effector member, which includes an acting magnet. The acting magnet corresponds to the acted magnet of the internal receptacle for generating an effect of one of mutual attraction and mutual expulsion. With the effect of mutual attraction or expulsion between the acting magnet and the acted magnet, the internal receptacle that receives and holds therein a substance to be brewed can be kept in a position of being immersed in the liquid held in the outer container. Upon releasing the effect of mutual attraction or expulsion of the magnets, the internal receptacle is floated upward by buoyance to achieve an effect of automatically separating the substance to be brewed from the liquid.

9 Claims, 15 Drawing Sheets

FIG. 17

MAGNETIC/FLOATING FORCE BASED BREWING STRUCTURE (a) Technical Field of the Invention The present invention relates generally to a brewing structure, and more particularly to a magnetic/floating force based brewing structure that allows a substance to be brewed to be kept in an immersed condition by means of a magnetic effect and allows the substance to be brewed to automatically separate from the liquid by means of a floating structure so as to achieve control of the concentration of the brew liquid of the substance.

(b) Description of the Prior Art

The prosperity and development of cities bring the vivid blooming of coffee shops at street corners. People meeting with friends and relatives is often held by supplying and enjoying fine coffee or tea and this often helps shorten the distance between people. For the time required for making coffee or tea is generally very short, allowing them to be serve quickly in an economic, efficient, and easy manner, and thus being widely prevailing.

A known way of brewing tea is to place tealeaves in a filter that is positioned in an opening of a cup and then pour hot water into the cup to have the tealeaves immersed in the hot water. The concentration of the tea is determined by the period of time when the tealeaves are immersed in the water. If the tealeaves are kept long in the water, then the tea would become bitter and harsh to taste with the extension of time of immersing, and the taste of tea is greatly affected. Thus, the filter and the tealeaves must be timely removed at the best time point of brewing, in order to prevent the tealeaves from being long immersed in the hot water and thus preventing the concentration of tea liquid from getting too high. To cope with such a problem, some tea brewers that are available in the market have been claimed to be effective in separating tealeaves and tea liquid after brewing. However, such brewers are generally suffering structure being complicated and operation being difficult.

Taiwan Utility Model M397213 discloses a "floating type tea brewing device", which allows tealeaves to be separated from tea liquid. However, a drawback is that a user must use a hand to hold and turn over a tea cup in order to have an upper filter and a lower filter to magnetically attracted to each other to achieve separation of tealeaves and tea liquid. The operation is troublesome and the use is very inconvenient.

Taiwan Utility Model M451065 discloses a brewing device and a brewer including brewing device, which although effective in separating tealeaves from tea liquid, suffer a deficiency of operation in that a user must use a hand to move a controller to move along an outer circumferential surface of a cup in order to have a filter moved upwards in the cup to drive the substance to be brewed to leave the liquid surface of the cup. The operation is troublesome and the use is very inconvenient.

The present invention, however, provides a brewing structure that comprises an internal receptacle that features automatic upward movement by means of a floating power or buoyance generated by a floating structure for separating the substance to be brewed from liquid thereby achieving an effect of controlling the concentration of the brew liquid of the substance. The operation is easy and the manufacturing costs are low. The above-mentioned Utility Models do not disclose the floating structure and the effect achieved therewith according to the present invention.

In addition, the above-mentioned Utility Models are structured to make use of magnetic attraction to fix the filters after the tealeaves and the tea liquid have been separated from each other. Oppositely, the present invention uses magnetic attraction to keep the internal receptacle in which the substance to be brewed is placed in a position of being immersed in the liquid held in an outer container. The magnetism related structure of the known devices and the present invention are generally different in respect of the issue to be addressed and the effects they achieve.

In view of the above, the present invention aims to provide a solution to overcome or alleviate the drawbacks of the conventional brewing devices.

SUMMARY OF THE INVENTION

An object of the preset invention is to provide a magnetic/floating force based brewing structure that keeps a substance to be brewed in an immersed condition by means of a magnetic effect and that allows the substance to be brewed to be automatically separated from the liquid by means of a floating structure so as to achieve control of the concentration of a brew liquid.

To achieve the above object, the present invention provides a magnetic/floating force based brewing structure that is used with an outer container. The magnetic/floating force based brewing structure comprises an internal receptacle and an effector member. The internal receptacle is arranged in the outer container. The internal receptacle comprises a receiving section, a floating structure, and at least one acted magnet. The effector member comprises an acting magnet. The acting magnet corresponds to the acted magnets in order to provide an effect of mutual attraction or mutual expulsion.

Through the mutual attraction or mutual expulsion between the acting magnet and the acted magnet, the internal receptacle in which a substance to be brewed is placed can be kept immersed in the liquid held in the outer container. Once the mutual attraction or mutual expulsion is released, the internal receptacle is floated upward by a floating power or buoyance generated by the floating structure so as to have the substance to be brewed automatically separated from the liquid to thereby achieve an effect of controlling the concentration of the brew liquid of the substance. As such, advantages of easy operation and low manufacturing costs are achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
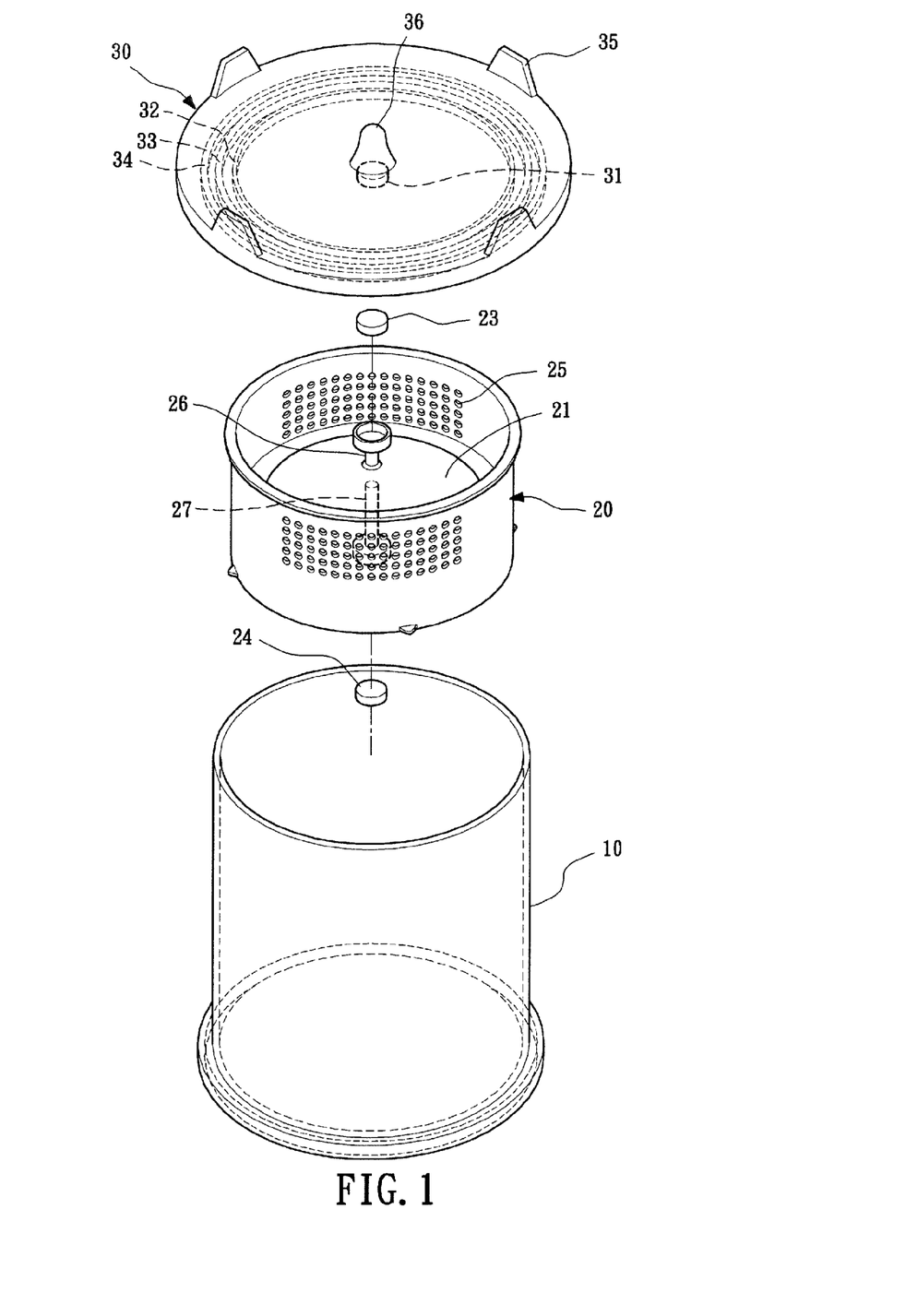
FIG. 1 is an exploded view of the present invention.
Figure 2:
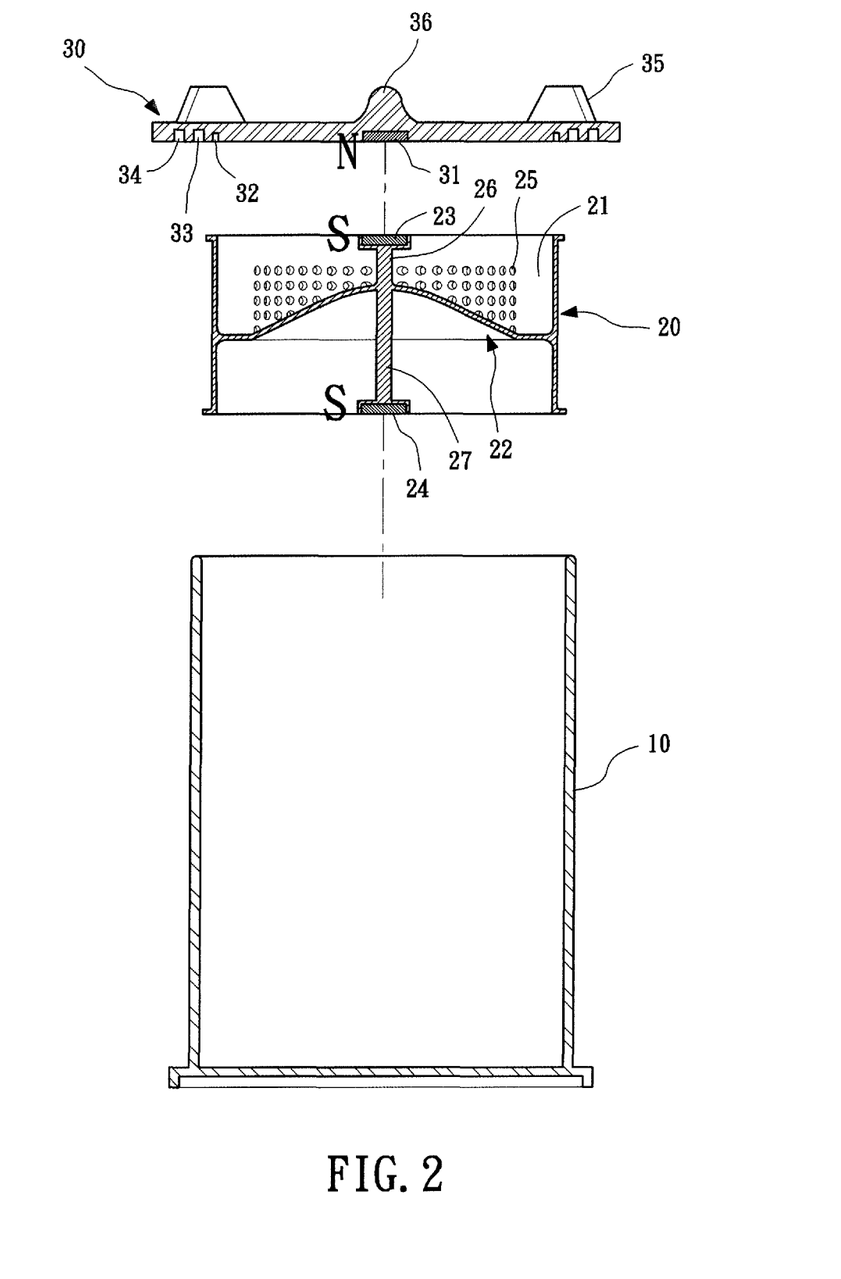
FIG. 2 is an exploded view, in a sectioned form, showing the present invention.
Figure 3:
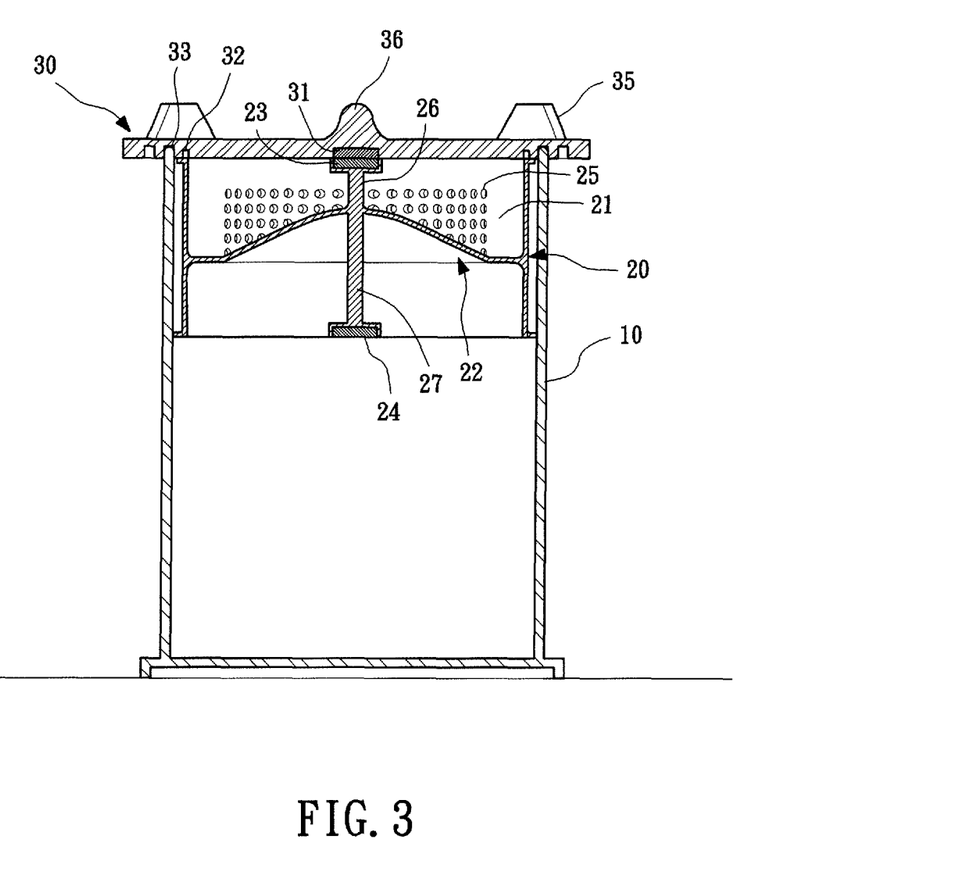
FIG. 3 is an exploded view, in an assembled form, showing the present invention.

Referring to FIGS. 1, 2, and 3, the present invention is used with an outer container 10. The present invention comprises an internal receptacle 20 and an effector member 30, of which details are provided below:

The container 10 is used to receive and contain a liquid, such as water, therein.

The internal receptacle 20 is arranged in the outer container 10. The internal receptacle 20 comprises a receiving section 21, a floating structure 22, and two acted magnets 23, 24. The receiving section 21 has a configuration that is closed at a bottom thereof and open at a top thereof for receiving therein a substance to be brewed, such as tealeaves. The floating structure 22 is arranged below the internal receptacle 20. In the instant embodiment, the acted magnets 23, 24 are respectively set at a top side and a bottom side of the internal receptacle 20. The acted magnets 23, 24 are each of a south (S) pole (wherein an exposed portion is of the negative magnetic polarity).

In a structure of an embodiment, the floating structure 22 of the internal receptacle 20 forms an inwardly recessed portion in a lower portion of the internal receptacle 20 in order to provide a floating power compartment that generates a floating force or buoyance.

In a structure of an embodiment, the internal receptacle 20 has a circumferential wall in which a plurality of openings 25 is formed and in communication with the receiving section 21 to allow the liquid contained in the container 10 to flow into the receiving section 21.

In a structure of an embodiment, an upper post 26 and a lower post 27 are respectively arranged in the upper and lower portions of the internal receptacle 20 for respectively receiving the acted magnets 23, 24 to mount thereto.

The effector member 30 comprises an acting magnet 31. In the instant embodiment, the acting magnet 31 is of a north (N) pole (wherein an exposed portion is of the positive magnetic polarity). The acting magnet 31 is arranged to correspond to the acted magnets 23, 24 of the internal receptacle to induce mutual attraction therebetween.

In a structure of an embodiment, the effector member 30 is made of a deformable elastic material, such as food grade silicon rubber.

In a structure of an embodiment, the effector member 30 comprises a plurality of annular clamping grooves 32, 33, 34 for respectively receiving and clamping opening rims of the internal receptacle 20 and the outer container 10 and a bottom flange of the outer container 10.

In a structure of an embodiment, the effector member 30 comprises a plurality of projections 35, which may serve as support leg of the effector member when the effector member is turned up-side down to serve as a cup mat.

In a structure of an embodiment, the effector member 30 comprises a grip section 36, which is provided for easy hand gripping.

Referring to FIG. 3, according to the present invention, the effector member 30 may have an outside diameter that is greater than the internal receptacle 20 and may thus serve as a cup cover with the annular clamping grooves 32, 33 respectively receiving and clamping the opening rims of the internal receptacle 20 and the outer container 10 for protecting the opening rims of the internal receptacle 20 and the outer container 10 contamination and further, the acting magnet 31 of the effector member 30 may be attracted by and attached to the acted magnet 23 at the top side of the internal receptacle 20 (through attraction between opposite polarities). As such, the effector member 30 can be coupled to the internal receptacle 20 and the outer container 10 with the internal receptacle 20 located in an upper portion of the outer container 10.

Figure 4:
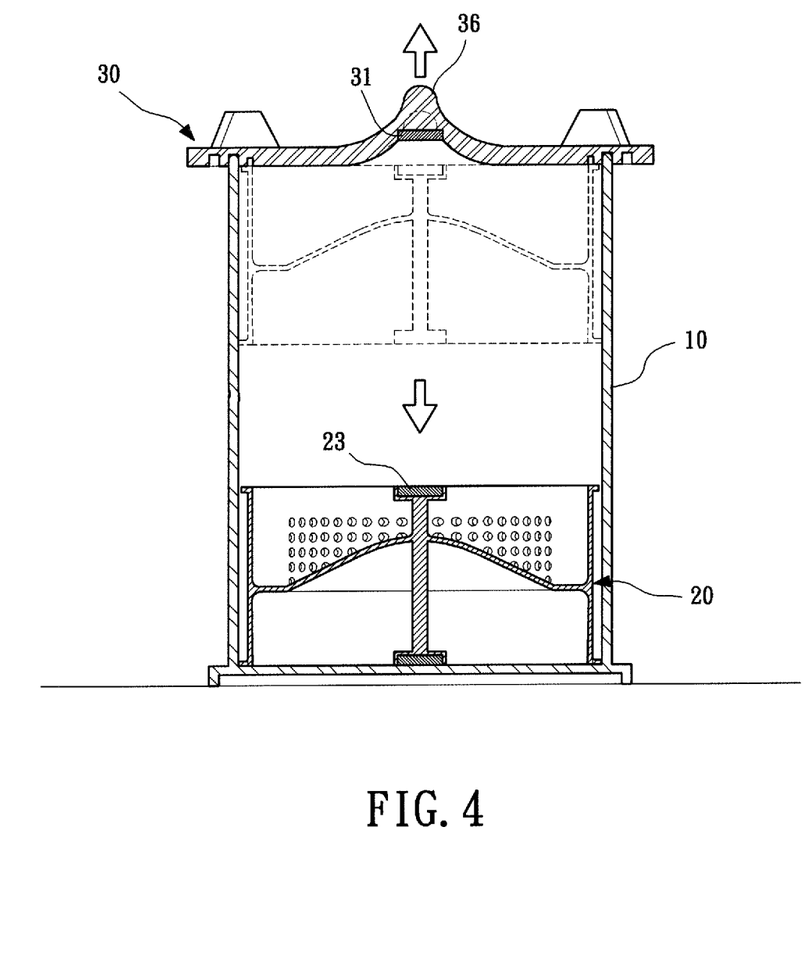
FIG. 4 is a schematic view illustrating an operation of the present invention.

Referring to FIG. 4, when a user grips the grip section 36 of the effector member 30 and applies an upward lifting force thereto, since a circumferential portion of the effector member 30 is kept in a fixed condition, a portion of the effector member 30 around the grip section 36 is acted upon by the force and gets deformed, driving the acting magnet 31 to move upward and away from the position and condition of being attracted by the acted magnet 23 so that the internal receptacle 20 is released and allowed to fall freely to a lower portion of the outer container 10.

Figure 5:
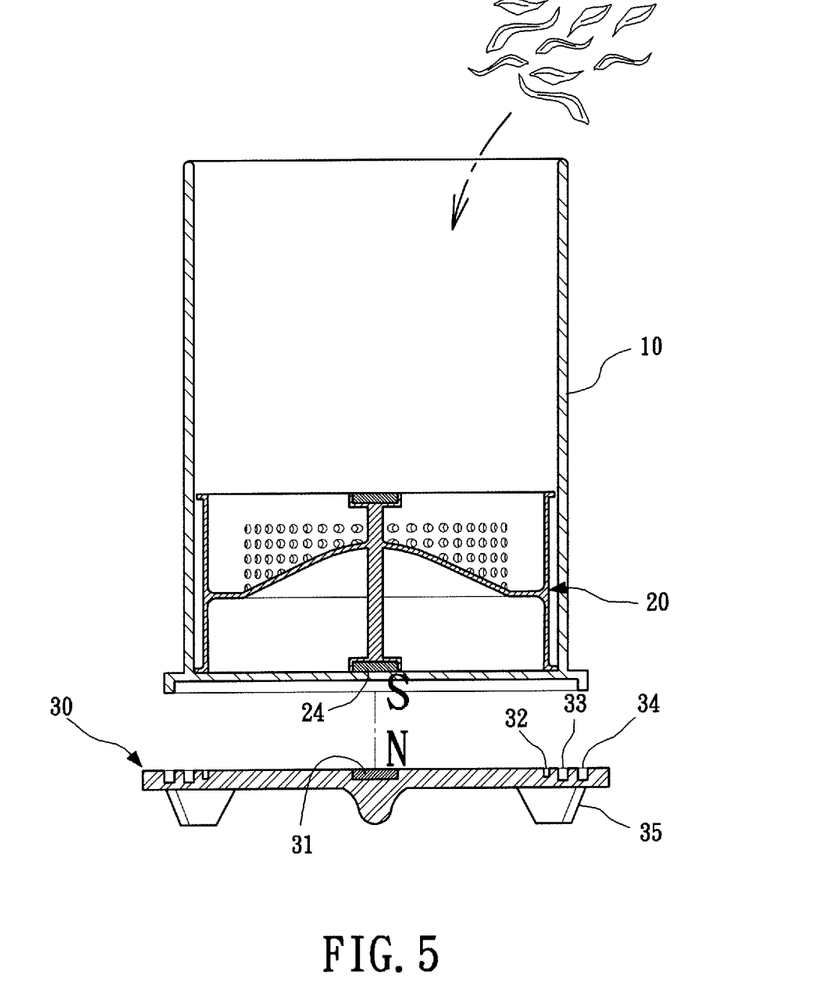
FIG. 5 is a schematic view illustrating the operation of the present invention.

Referring to FIG. 5, a substance to be brewed, such as tealeaves, is placed into the outer container 10 and the internal receptacle 20. In this condition, the effector member 30 may be turned up-side down and placed under the outer container 10 to serve as a cup mat.

Figure 6:
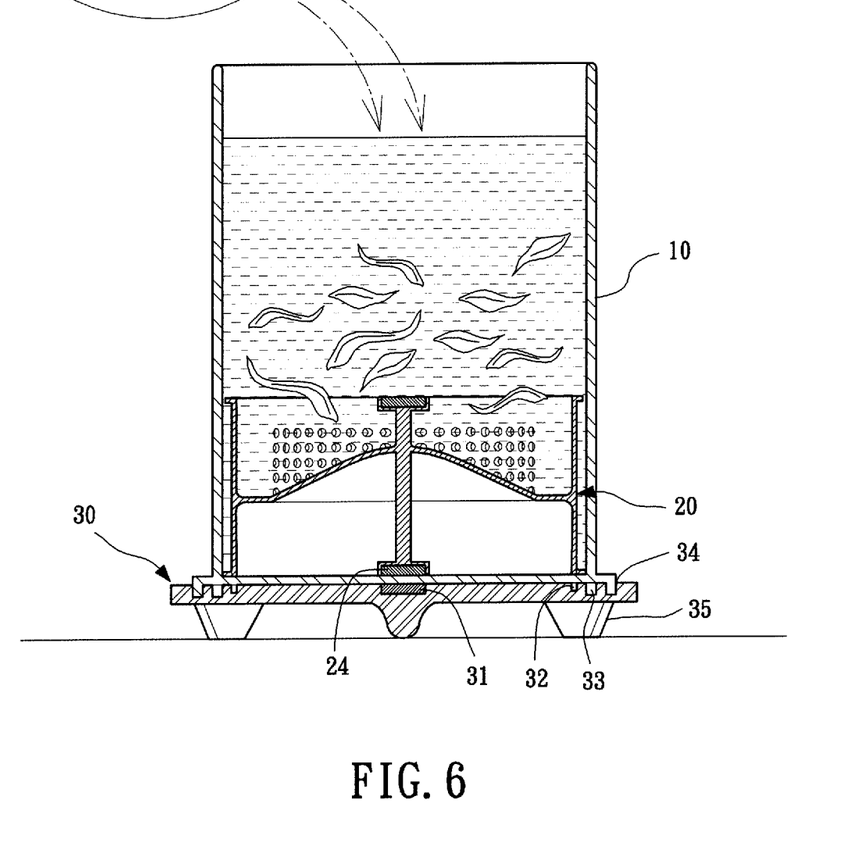
FIG. 6 is a schematic view illustrating the operation of the present invention.

Referring to FIG. 6, hot or boiled water may then be poured into the outer container 10 and the internal receptacle 20. In this condition, the acting magnet 31 of the effector member 30 exactly corresponds to the acted magnet 24 that is now at the bottom of the outer container 10 so that the attraction of opposite polarities between the acting magnet 31 and the acted magnet 24 helps keep the internal receptacle 20, in which the substance to be brewed is placed, in such a position of being immersed in the liquid contained in the outer container 10 to make a brew substance liquid.

In this condition, the effector member 30 is held in position by the annular clamping groove 34 receiving and clamping the bottom flange of the outer container 10 so that the annular clamping grooves 32, 33 are protected from contamination.

Figure 7:
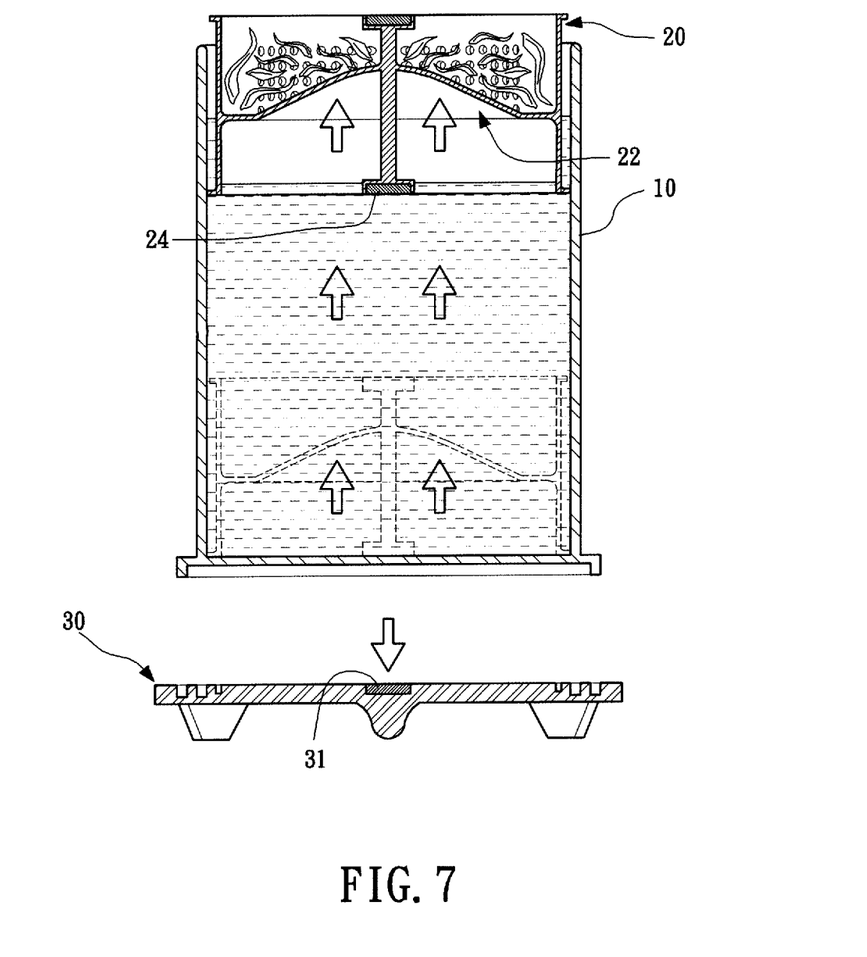
FIG. 7 is a schematic view illustrating the operation of the present invention.

Referring to FIG. 7, when the effector member 30 is removed from the bottom of the outer container 10, the magnetic attraction between the acting magnet 31 and the acted magnet 24 is released so that the internal receptacle 20 is caused by the floating power or buoyance generated by the floating structure 22 to automatically float upward to locate on the liquid surface of the outer container 10, so that the brew substance is automatically separated from the liquid thereby achieving an effect of controlling the brewing concentration of the brew substance liquid.

Figure 8:
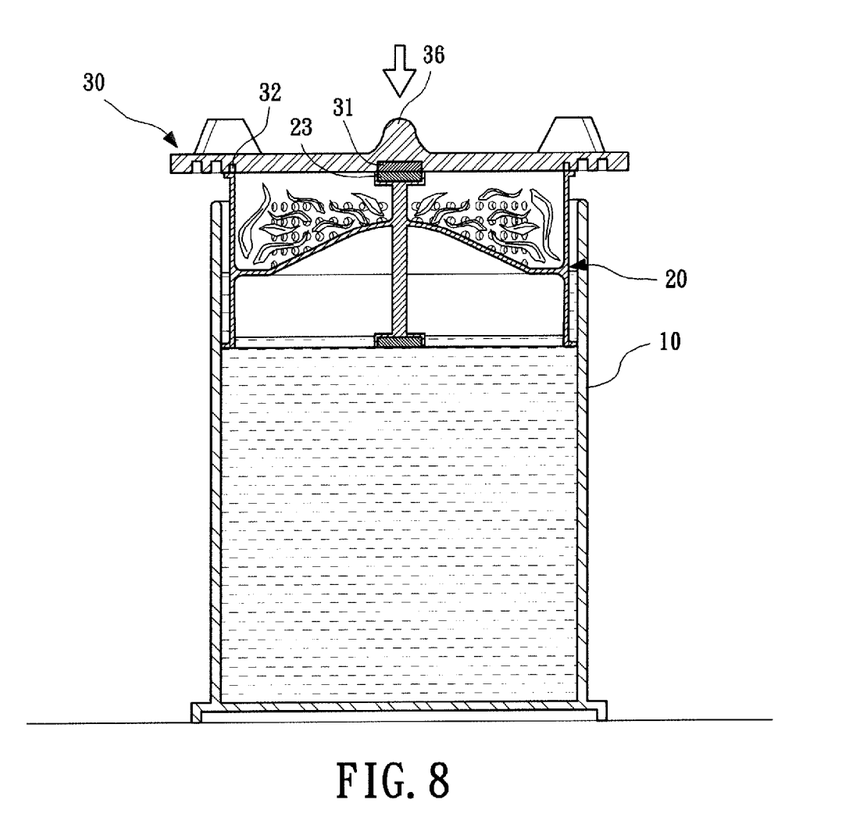
FIG. 8 is a schematic view illustrating the operation of the present invention.
Figure 9:
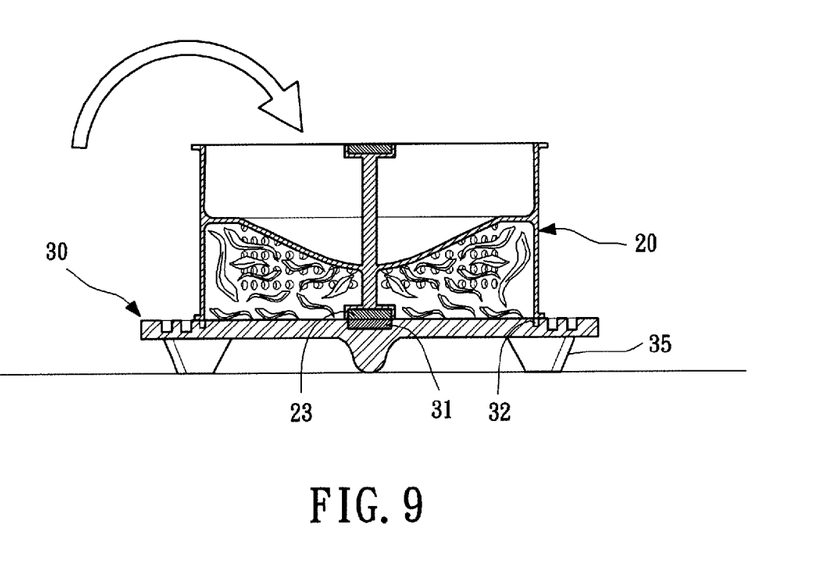
FIG. 9 is a schematic view illustrating the operation of the present invention.

Referring to FIGS. 8 and 9, when the internal receptacle 20 floats on the liquid of the outer container 10, the annular clamping groove 32 of the effector member 30 may then be used to receive and clamp on the opening rim of the internal receptacle 20 and the acting magnet 32 of the effector member 30 is in magnetic attraction with the acted magnet 23 at the top of the internal receptacle 20 (due to magnetic attraction between opposite polarities). As such, the effector member 30 is attached to the internal receptacle 20, allowing the user to grip with one hand for removing the effector member 30 and the internal receptacle 20 together from the outer container 10 and to be turned up-side down for being positioned on a fixture surface. Since the user's hand does not touch the opening rims of the outer container 10 and the internal receptacle 20, hygiene can be maintained and enhanced.

Figure 10:
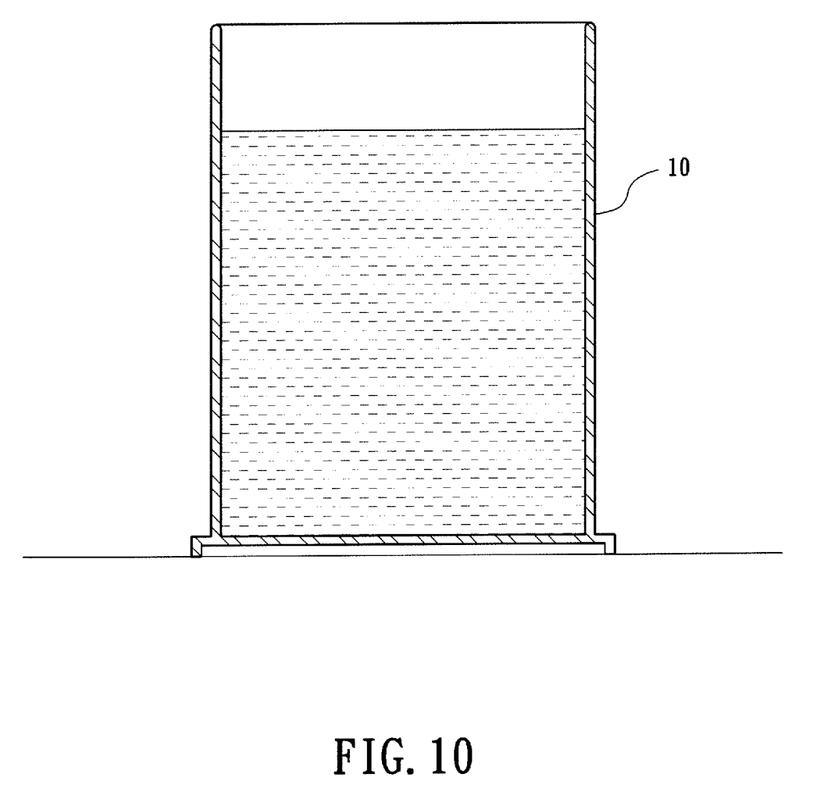
FIG. 10 is a schematic view illustrating the operation of the present invention.

Referring to FIG. 10, after the effector member 30 and the internal receptacle 20 are removed out of the outer container 10, the user may readily drink the brew substance liquid held in the outer container 10.

In summary, the present invention provides various advantages including easy operation, low manufacturing costs, and excellent hygiene.

Figure 11:
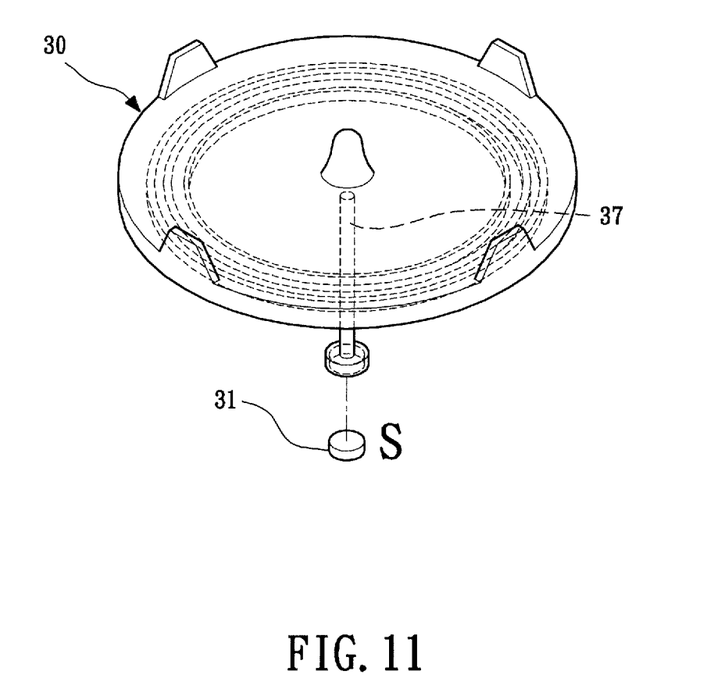
FIG. 11 is a perspective view showing another embodiment of an effector member according to the present invention.

Referring to FIG. 11, in a structure of an embodiment, according to the present invention, the structures of the outer container 10 and the internal receptacle 20 can be maintained the same as those discussed previously, while the acting magnet 31 of the effector member 30 is changed to a S pole and the effector member 30 comprises a bar 37 extending downwards to carry and support the acting magnet 31.

Figure 12:
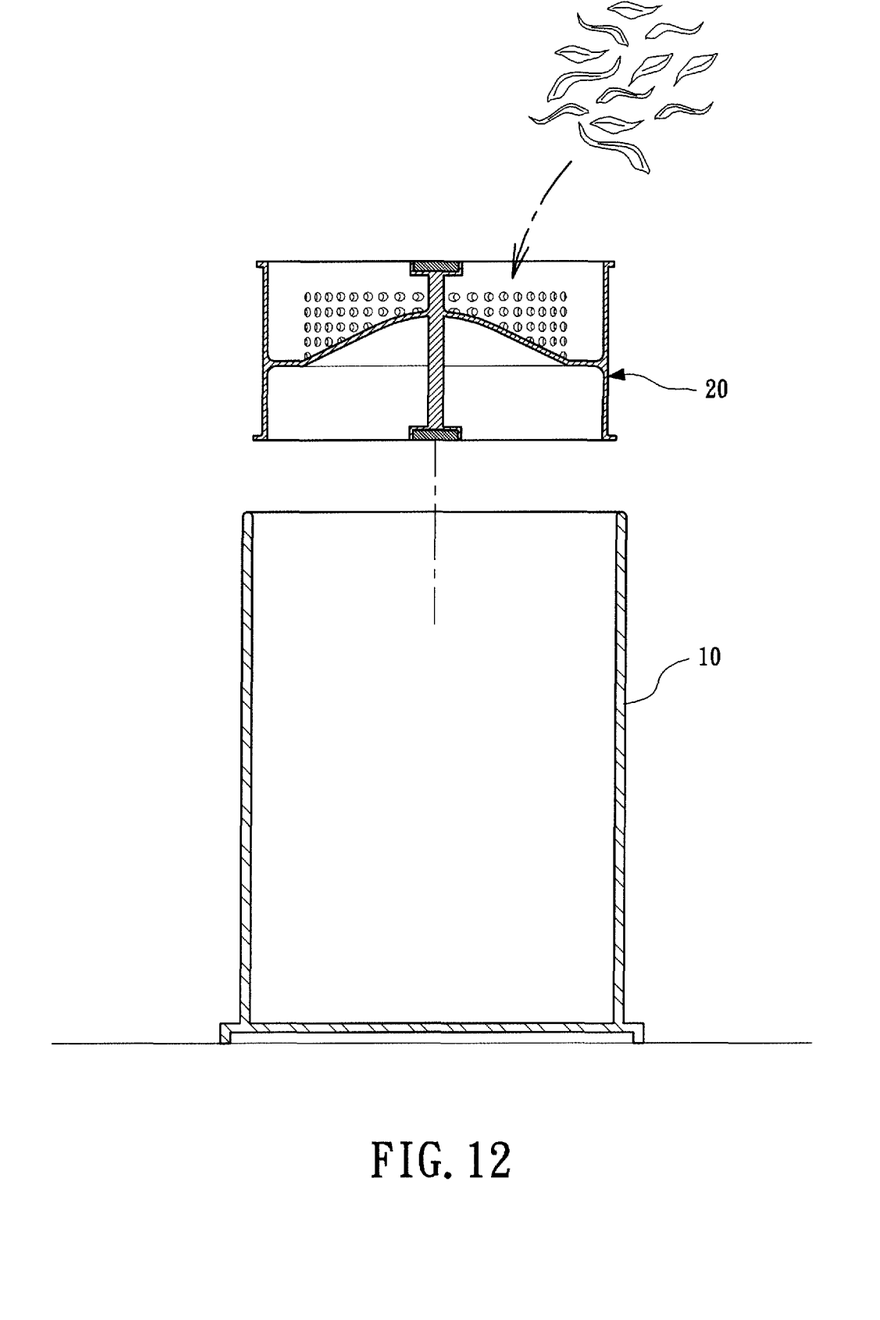
FIG. 12 is a schematic view illustrating an operation of the present invention.
Figure 13:
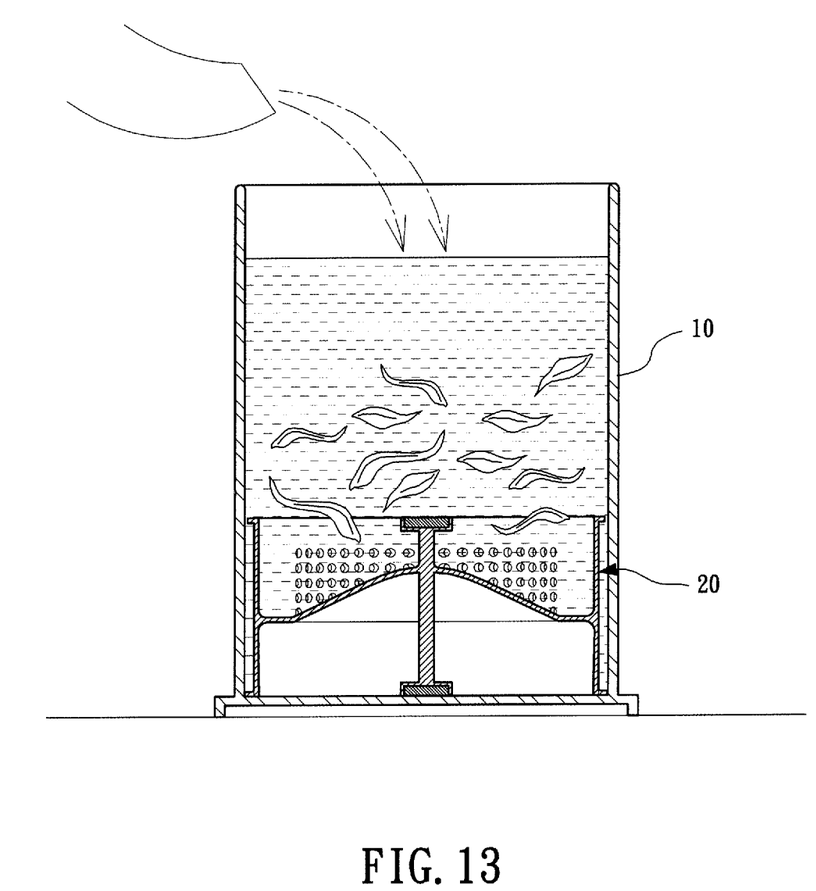
FIG. 13 is a schematic view illustrating the operation of the present invention.

Referring to FIGS. 12 and 13, a substance to be brewed may be placed in the internal receptacle 20 in advance and then, the internal receptacle 20 is placed into the outer container 10 and then, hot or boiled water is poured into the outer container 10 and the internal receptacle 20.

Figure 14:
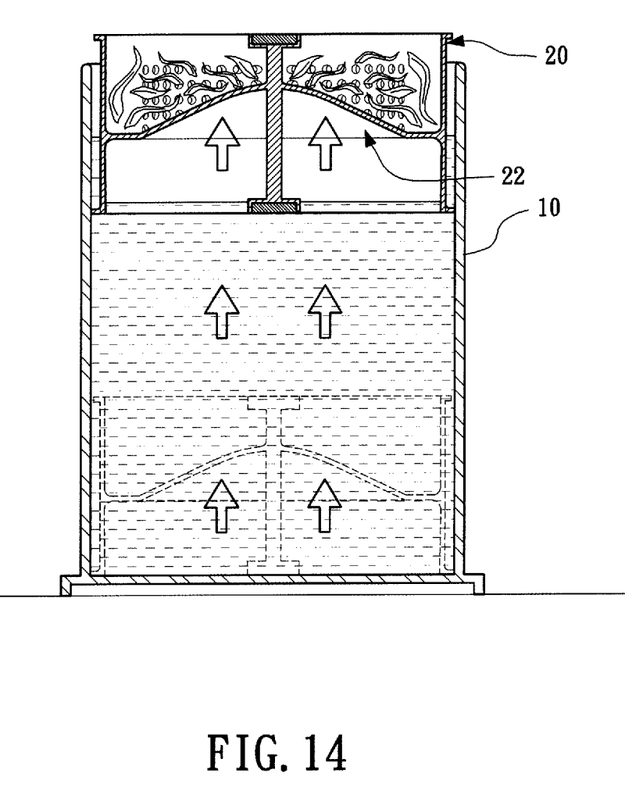
FIG. 14 is a schematic view illustrating the operation of the present invention.

Referring to FIG. 14, the internal receptacle 20 may then float upward automatically by means of the floating power or buoyance generated by the floating structure 22 to be located on the liquid of the outer container 10.

Figure 15:
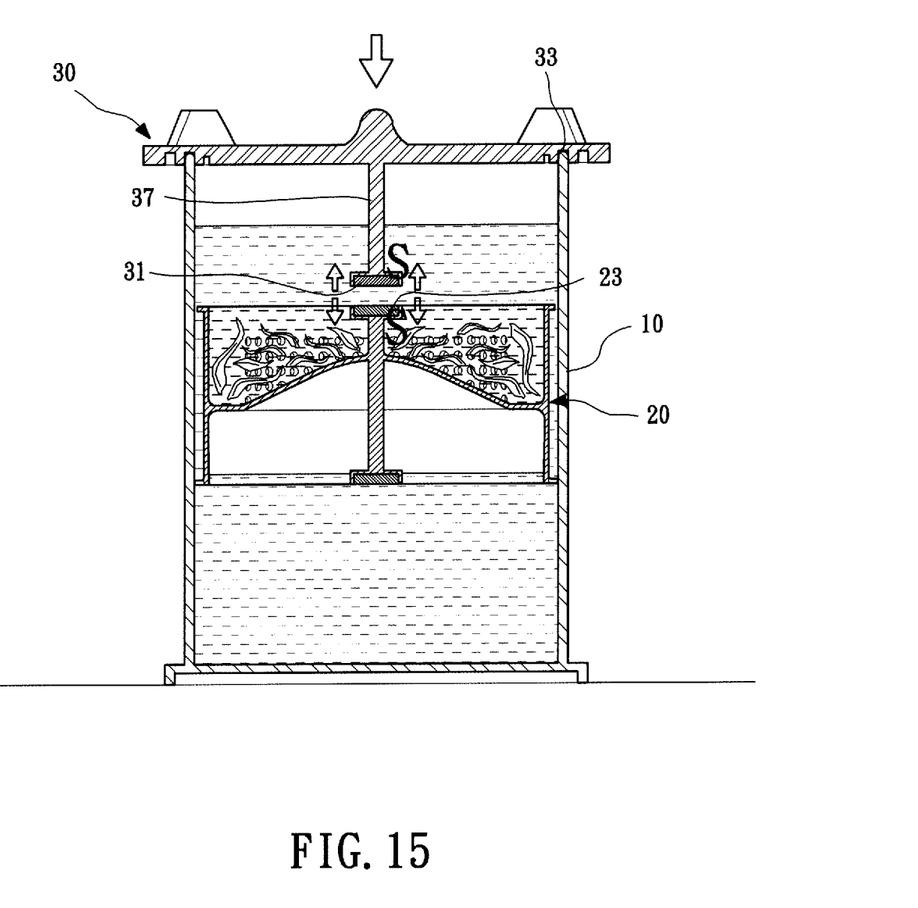
FIG. 15 is a schematic view illustrating the operation of the present invention.

Referring to FIG. 15, the annular clamping groove 33 of the effector member 30 may be used to receive and clamp on the opening rim of the outer container 10. In this condition, the acting magnet 31 of the effector member 30 and the acted magnet 23 at the top of the internal receptacle 20 are both south pole so that expulsion of identical polarity between the acting magnet 31 and the acted magnet 23 would help keep the internal receptacle 20, in which the substance to be brewed is placed, in such a position of being immersed in the liquid held in the outer container 10 to make a brew liquid of the substance.

Figure 16:
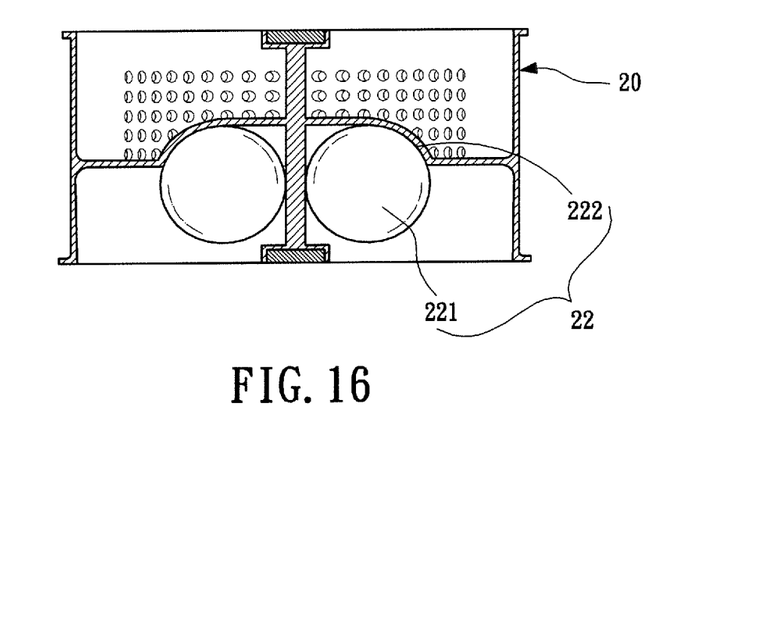
FIG. 16 is a schematic view showing another embodiment of a floating structure according to the present invention.

Referring to FIG. 16, in a structure of an embodiment, the floating structure 22 of the internal receptacle 20 comprises two spheres 221 and a constraint section 222. The spheres 221 are structured and provided go generate a floating power or buoyance. The constraint section 222 is in the form of a recess formed in a lower side of 於 the internal receptacle 20 in order to constrain the spheres 221 at the lower side of the internal receptacle 20.

Figure 17:
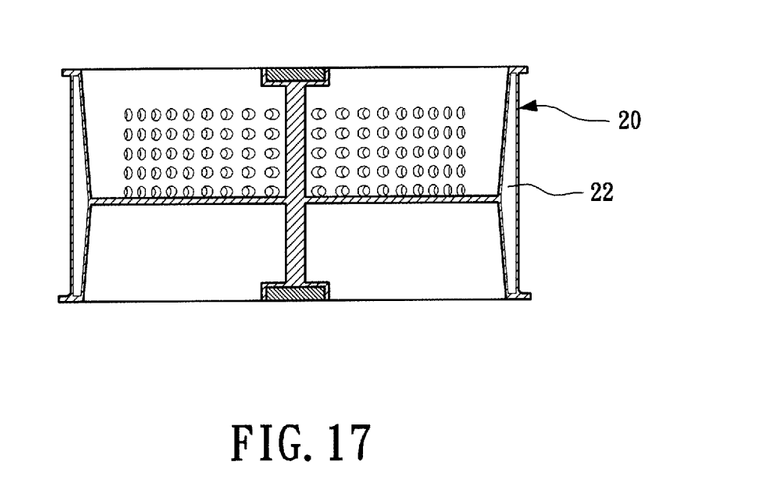
FIG. 17 is a schematic view showing a further embodiment of the floating structure according to the present invention.

Referring to FIG. 17, in a structure of an embodiment, the floating structure 22 of the internal receptacle 20 comprises a hollowed floating compartment formed in the internal receptacle 20 to generate a floating power or buoyance. In the instant embodiment, the floating structure 22 is arranged along a circumferential wall of the internal receptacle 20.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A magnetic/floating force based brewing structure, which is used with an outer container, the magnetic/floating force based brewing structure comprising:
   an internal receptacle, which is arranged in the outer container, the internal receptacle comprising a receiving section, a floating structure, and at least one acted magnet; and
   an effector member, which comprises an acting magnet, the acting magnet corresponding to the acted magnet of the internal receptacle to provide an effect of mutual attraction or mutual expulsion;
   wherein the effector member comprises a plurality of annular clamping grooves for respectively receiving and clamping opening rims of the internal receptacle and the outer container and a bottom flange of the outer container.

2. The magnetic/floating force based brewing structure according to claim 1, wherein the floating structure of the internal receptacle comprises a recess formed in a bottom of the internal receptacle.

3. The magnetic/floating force based brewing structure according to claim 1, wherein the internal receptacle comprises a circumferential wall in which a plurality of openings is formed and in communication with the receiving section.

4. The magnetic/floating force based brewing structure according to claim 1, wherein the internal receptacle comprises a post arranged in one of an upper portion and a lower potion thereof for supporting the acted magnet.

5. The magnetic/floating force based brewing structure according to claim 1, wherein the effector member is formed of a deformable elastic material.

6. The magnetic/floating force based brewing structure according to claim 1, wherein the effector member comprises a plurality of projections.

7. The magnetic/floating force based brewing structure according to claim 1, wherein the effector member comprises a grip section.

8. The magnetic/floating force based brewing structure according to claim 1, wherein the floating structure of the internal receptacle comprises two spheres and a constraint section, the spheres being structured to generate a floating force, the constraint section comprises a recess formed in an underside of the internal receptacle for constraining the spheres at the underside of the internal receptacle.

9. The magnetic/floating force based brewing structure according to claim 1, wherein the floating structure of the internal receptacle comprises a hollowed floating compartment formed in the internal receptacle.

* * * * *